Patented June 6, 1944

2,350,328

UNITED STATES PATENT OFFICE 2,350,328

PROCESS FOR THE PREPARATION OF A NEW PARASITE CONTROL MATERIAL

William C. Hellings, Los Angeles, and Forrest B. McLane, Montebello, Calif., assignors to Stauffer Chemical Company, a corporation of California No Drawing. Application July 3, 1942, Serial No. 449,594

12 Claims. (Cl. 167—20)

This invention relates to the production of a new material useful in the control of various parasites including insects, arachnida as red spider, and other pests.

The material of this invention includes a fish poison as one of its components and sulphur as the other. However, the two are so treated, as will presently appear, that many of the characteristics of each are absent, while the material of this invention possesses desirable characteristics distinguishing it from its original components. This is advantageous for fish poisons usually deteriorate rapidly in sunlight, while the material of this invention does not. In some instances too the material of this invention is effective as a contact poison under conditions and against parasites where sulphur, a fish poison alone or sulphur and a fish poison in a mechanical mixture are of no use.

In preparing the material, sulphur is heated to above its melting point and a fish poison or a suitable constituent of a fish poison is then mixed into the molten sulphur. The mixture is stirred to distribute the fish poison thoroughly throughout the sulphur. Thereafter the mass is permitted to cool.

When the mass is reduced to finely divided form, the material is useful either in an aqueous spray or in a dust, to control various parasites. When employed as a dust it enables pests to be controlled more effectively than they are controlled at this time by dusts wherein the effective constituent is rotenone alone or in combination with other materials such as pyrethrum, lethane and nicotine. Nor is the present material to be confused with a mechanical mixture of sulphur and rotenone made up by mechanical mixing or comminution of the two materials in the presence of each other, the material of this invention being far more effective than these as well as the aforementioned combination dusts. In usual dust mixtures, the separate dust constituents can be recovered as such and in the quantities originally added to the dust. This is not the case when the sulphur is heated and the fish poison added; if any sulfur or fish poison can be recovered as such from the resulting mass it is a very small quantity compared to that going into the mass.

In making up the material of this invention, the temperature of the sulphur is of importance, and I have found that the best temperature is about 145° C. although temperatures as low as 125° C. and as high as 200° C. can be employed. However, on red spider the maximum kill is obtained at about 145° C. with about a 75% kill at 125° C. The kill between 145° C. and 180° C. decreases almost uniformly and at 185° C. it is only 50%.

The weight of sulphur to the weight of fish poison employed can vary over a fairly wide range and a very high kill has been obtained with materials containing as much as 94% to 98% sulphur, while good kills have been obtained with as little as 60% sulphur, the remainder being a fish poison. However, inasmuch as the fish poison is the most expensive ingredient entering into the composition, in general it is advisable to keep the fish poison content as small as possible.

As a fish poison one can successfully employ such materials as derris, cube, timbo, barbasco, tuba, hairri and the like, usually in comminuted form. Instead of the raw materials one can employ the rotenone containing extract of these materials, either purified or impure, or the non-rotenone extract. Apparently these materials contain complex compounds, one or more of which react with sulphur under the conditions set forth. That a definite reaction product is formed is shown by the fact that when the fish poison is added, a slight increase in sulphur temperature is noted. Further, neither the sulphur nor the rotenone can be recovered to any large extent from the reaction mass by treatment with a suitable solvent. So far we have been unable to identify and assign a structural formula to the material.

The rotenone carrying extract and non-rotenone containing extract residue as well as the crude materials as such are effective. For example, derris was extracted with carbon tetrachloride to secure the crude rotenone. The carbon tetrachloride was evaporated and the crude rotenone crystallized. This was then purified in ethyl alcohol. The non-rotenone resins remaining after separation of the rotenone were also recovered. Satisfactory kills were obtained with each of these materials upon fusion with sulphur by the method outlined. In this case 96.1 parts by weight of sulphur were employed with 3.9 parts of rotenone while 93.9 parts of sulphur by weight were used with 6.1 parts of non-rotenone containing resins. The term fish poison is employed herein and in the claims as applying to all these materials which are generally procured from plants known and classed as fish poisons. These are listed by R. C. Roark in Amer. J. Pharm. 1919, 91, pgs. 25–37 and 91–107, and in the following U. S. Dept. Agr. publications: Bur.

Ent. Monographs E 453, 402 and 367 and Misc. Pub. No. 120.

In aqueous spray suspensions the material is usually employed in an amount of about two pounds per 100 gallons of water, together with a small amount of a suitable wetting agent. More or less, about one half pound to about five pounds to the 100 gallons can be used, however.

*Example I.*—A material was made up by heating 95 pounds of sulphur with five pounds of derris resin extract containing 39% rotenone. The sulphur was heated to 180° C. and the source of heat removed. The derris resins were then added and mixed in thoroughly. The mass was allowed to cool after which it was ground to pass a 100 mesh screen. A comparative test was made of this material as against a wettable sulphur as a standard, on red spider on citrus trees. Using one pound of the resin fusion mass to 100 gallons of water, together with a small amount of a suitable wetting agent, commercial control was effected over the spider, better than a 90% kill being secured where the control kill was zero. Using a pound and one-quarter of wettable sulphur to 100 gallons of water had little if any effect upon the spider infestation. The two sprays were applied on trees in the same grove at substantially the same time and all conditions, except the material employed, which might affect the comparison were common to both applications, such as temperature, humidity, wind, etc.

Similar favorable results were secured using the rotenone extract as such, the non-rotenone resins and the whole ground crude material.

The fusion material is also effective against pests other than spiders. For example, a dust was made up by mixing ten pounds of the 5% derris resin fusion mixture previously described with 90 pounds of an inert, neutral carrier. This was applied under identical conditions with a dust containing 0.5% rotenone and 3% lethane and one with 0.5% rotenone. The 5% derris fusion dust was outstanding in that it had a contact poison action against cabbage worms, morning cloak worms, cabbage aphis, nasturtium aphis and white fly larvae, whereas the other two dusts lacked this action entirely and were only partially effective. The derris resin fusion dust was far more effective in its kill. Generally the dust containing the fusion product gave a more complete and quicker kill than did sulphur on citrus thrips and red spider.

As a carrier any inert neutral material can be used as Frianite, a pumice material or fuller's earth, diatomaceous earth, soapstone and the like. The material can be used as a dry dust on pets. On cattle it can be used as a paste, a dry dust or as a dip, 2 to 4 pounds to 100 gallons being employed.

We claim:

1. A process for preparation of a parasite control material comprising heating a mass of sulphur to a temperature whereat the sulphur is molten and below about 200° C., adding to the molten sulphur mass a small mass of a fish poison, stirring the mixture to distribute the fish poison through the sulphur mass, cooling the mixture, and reducing the solidified mixture to finely divided form.

2. A process as in claim 1 wherein the sulphur is heated to a temperature of about 145° C.

3. A process as in claim 1 wherein the sulphur is heated to a temperature between 125° C. and 200° C.

4. A process as in claim 1 wherein the sulphur-fish poison quantities, by weight are between 2 to 1 and 100 to 1.

5. A parasite control material made according to the process of claim 1.

6. A parasite control material made according to the process of claim 2.

7. A parasite control material made according to the process of claim 3.

8. A parasite control material made according to the process of claim 4.

9. The process of claim 1 wherein the fish poison is rotenone.

10. The process of claim 1 wherein the fish poison is an extract of a fish poison.

11. The process of claim 1 wherein the fish poison is a non-rotenone containing extract of a fish poison.

12. The process of claim 1 wherein the fish poison is a dry, finely divided natural fish poison.

WILLIAM C. HELLINGS.
FORREST B. McLANE.